United States Patent
Cannon et al.

[11] Patent Number: 6,026,152
[45] Date of Patent: Feb. 15, 2000

[54] RING COUNT CONTROLLED BY INCOMING CALL RELATED INFORMATION

[75] Inventors: Joseph M. Cannon, Harleysville; James A. Johanson, Emmaus, both of Pa.

[73] Assignee: Lucent Technologies Inc., Murray Hill, N.J.

[21] Appl. No.: 08/992,113

[22] Filed: Dec. 17, 1997

[51] Int. Cl.[7] ........................ H04M 1/56
[52] U.S. Cl. ............... 379/142; 379/372; 379/373
[58] Field of Search .................. 379/93.23, 142, 379/354, 372–377, 207, 157, 177, 182, 185; 455/38.4, 550, 566–567, 575

[56] References Cited

U.S. PATENT DOCUMENTS

| | | | |
|---|---|---|---|
| 4,924,496 | 5/1990 | Figa et al. ........................... | 379/142 |
| 4,998,273 | 3/1991 | Nichols ............................. | 379/102.02 |
| 5,040,209 | 8/1991 | Greenberg et al. .................. | 379/373 |
| 5,163,082 | 11/1992 | Karnowski ......................... | 379/88 |
| 5,228,080 | 7/1993 | Nutter et al. ....................... | 379/373 |
| 5,559,860 | 9/1996 | Mizikovsky . | |
| 5,604,791 | 2/1997 | Lee .................................. | 379/67 |
| 5,655,011 | 8/1997 | Brown ............................... | 379/93.06 |
| 5,724,411 | 3/1998 | Eisdorfer et al. ................... | 379/93.23 |

Primary Examiner—Paul Loomis
Assistant Examiner—Duc Nguyen

[57] ABSTRACT

A variable ring count device in customer premises equipment is provided and includes a processor, a call related information detector/receiver in communication with a telephone line and a call related information directory in communication with the processor. The call related information directory associates pre-set call related information with a corresponding ring count. The processor is operable for an incoming call to compare call related information for the incoming call to the pre-set call related information in the call related information directory, and to determine a ring count for the incoming call based on a correlation between the call related information and the pre-set call related information in the call related information directory.

25 Claims, 4 Drawing Sheets

RING COUNT CONTROLLED BY INCOMING CALL RELATED INFORMATION

BACKGROUND OF THE INVENTION

1. Field of the Invention

The present invention relates to a telephone answering device (TAD) wherein the number of rings encountered before the TAD begins its outgoing announcing message is user programmable based on incoming call related information.

2. Description of Related Art

A TAD is useful in today's world, e.g., to capture and playback voice messages received while the user is not able to answer the call. Typically, a TAD will not pick-up the incoming call until a pre-selected number of rings have occurred. This enables a user time to answer the telephone before the TAD initiates an outgoing announcing message. Otherwise, the TAD will receive and store a voice message from the caller.

Conventional TADs permit a user to manually set the number of rings encountered before the device begins its announcing message sequence. Generally, a TAD has three manually selectable ring count options such as one ring, two rings or four rings before the pre-stored outgoing announcing message is initiated. Generally, the one ring and two ring options are not popular selections since there may not be enough time for one to answer the telephone before the outgoing announcing message is initiated. Thus. typically, the four ring option is most often selected.

There are certain circumstances when it may not be desirable to wait for four rings to occur prior to the initiation of the outgoing announcing message and subsequent voice message and recording sequence. For example, when one is accessing his or her own TAD remotely to check messages and is therefore not home to answer the telephone. In such a case, it is inconvenient to wait until four rings have occurred before being able to direct the TAD to playback any stored voice messages.

In addition, it may be desirable to wait more than four rings before a TAD initiates an outgoing announcing message, e.g., for call screening purposes, or to allow a facsimile machine connected to the telephone line time to pick-up. However, conventional TADs either require a manual switch to be set to make any change to a ring count setting. Conventional TADs do not change ring count on a call-to-call basis, and thus provide no assistance for call screening purposes while in an on-hook condition.

There is a need for a TAD having flexibility which allows adjustment of the ring count on a call-to-call basis so as to require a few rings before answering when a user is not home, to require an increased number of rings for certain callers such as family, and to allow a facsimile machine time to answer an incoming facsimile.

SUMMARY OF THE INVENTION

In accordance with the principles of the present invention a variable ring count device in customer premises equipment is provided and includes a processor, a call related information detector/receiver in communication with a telephone line and a call related information directory in communication with the processor. The call related information directory associates pre-set call related information with a corresponding ring count. The processor is operable for an incoming call to compare call related information for the incoming call to the pre-set call related information in the call related information directory, and to determine a ring count for the incoming call based on a correlation between the call related information and the pre-set call related information in the call related information directory.

In accordance with the principles of the present invention, a method of setting a ring count for an incoming call to a customer premises equipment in an on-hook condition is provided. The method includes detecting and receiving call related information relating to the incoming call. The detected and received call related information is compared with a memory containing pre-set call related information with associated values of the ring count. The ring count is set in the customer premises equipment for the incoming call based on a value of the ring count associated with a correlation between the detected and received call related information and the pre-set call related information in the call related information directory.

BRIEF DESCRIPTION OF THE DRAWINGS

Features and advantages of the present invention will become apparent to those skilled in the art from the following description with reference to the drawings, in which.

DETAILED DESCRIPTION OF THE ILLUSTRATIVE EMBODIMENTS

The present invention relates to a voice messaging system such as a telephone answering device or voice mail system which adjusts a pre-set number of rings or ring count which must occur before an outgoing announcing message is initiated. The ring count is adjusted based on call related information associated with an incoming call received by the voice messaging system.

The disclosed embodiments relate to a telephone answering device in particular, but the principles disclosed herein are equally applicable to voice messaging systems in general. Moreover, while the disclosed embodiments describe the reception of Caller ID information, the invention relates to the reception and processing of any call related information.

Many telephone companies offer a special service which transmits call related information to a called party while the called party is in an on-hook condition. One such service is called Caller ID. Using Caller ID, typically a caller's telephone number and/or household name is transmitted by the telephone company to the called party generally during the silent interval between the first two rings. Caller ID systems which receive caller ID information from incoming calls are known.

Figure 4:
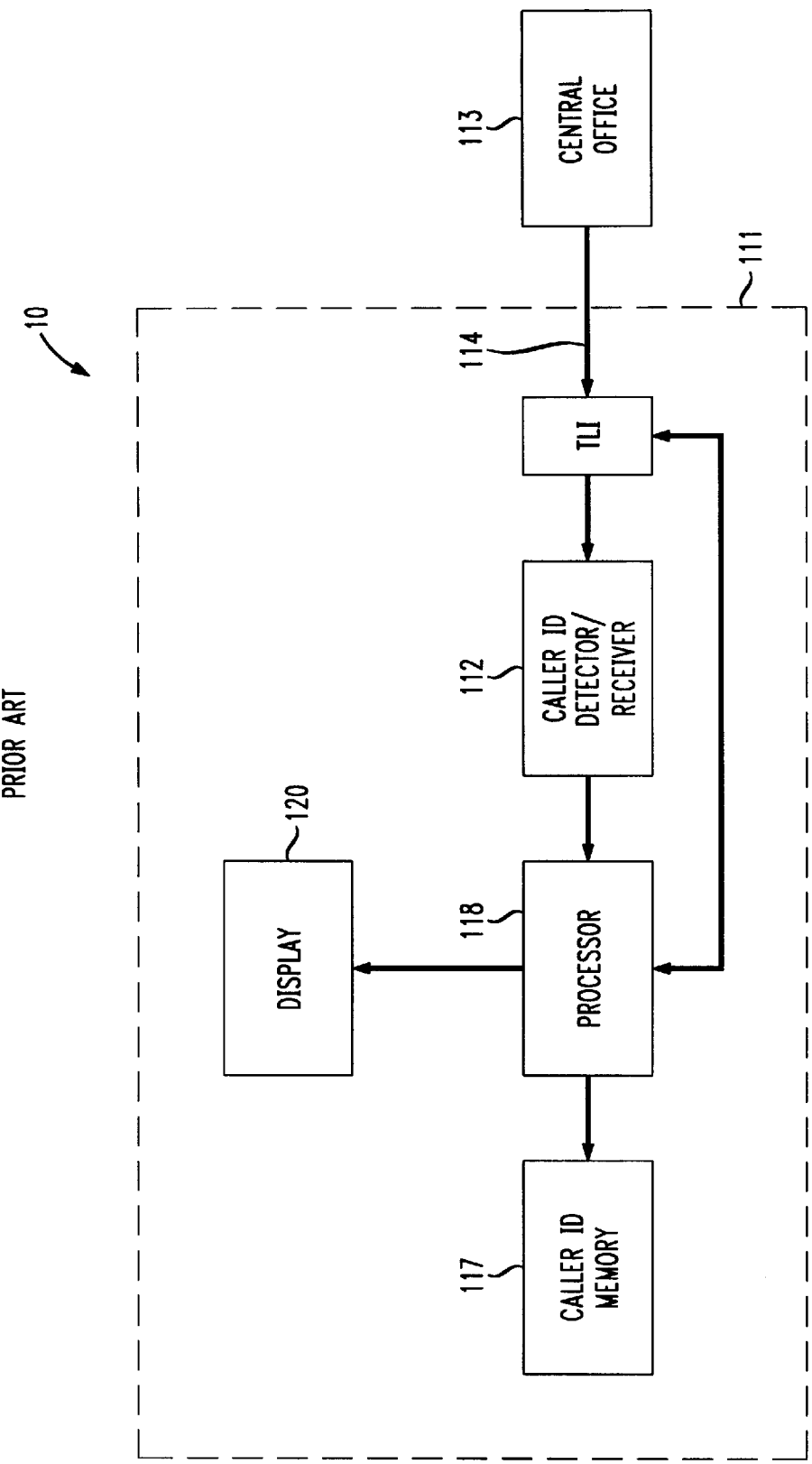
FIG. 4 is a block diagram illustrating a conventional caller ID information display system.

One conventional Caller ID system is shown in FIG. 4. Customer premises equipment (CPE) 111 includes a Caller ID detector and receiver 112 which decodes and displays the telephone number and/or household name of a calling party received from a central office 113 over the telephone line 114. When the customer premises equipment 111 is on-hook, the telephone number and/or household name of the calling party are detected and received by the Caller ID detector and receiver 112 during the silent interval between the first and second rings.

The CPE 111 includes a processor 118 and a display 120. The incoming telephone number and other detected Caller ID information are stored in Caller ID memory 117 and displayed on display 120. The processor 118 is a digital signal processor (DSP), microprocessor or microcontroller.

Figure 1:
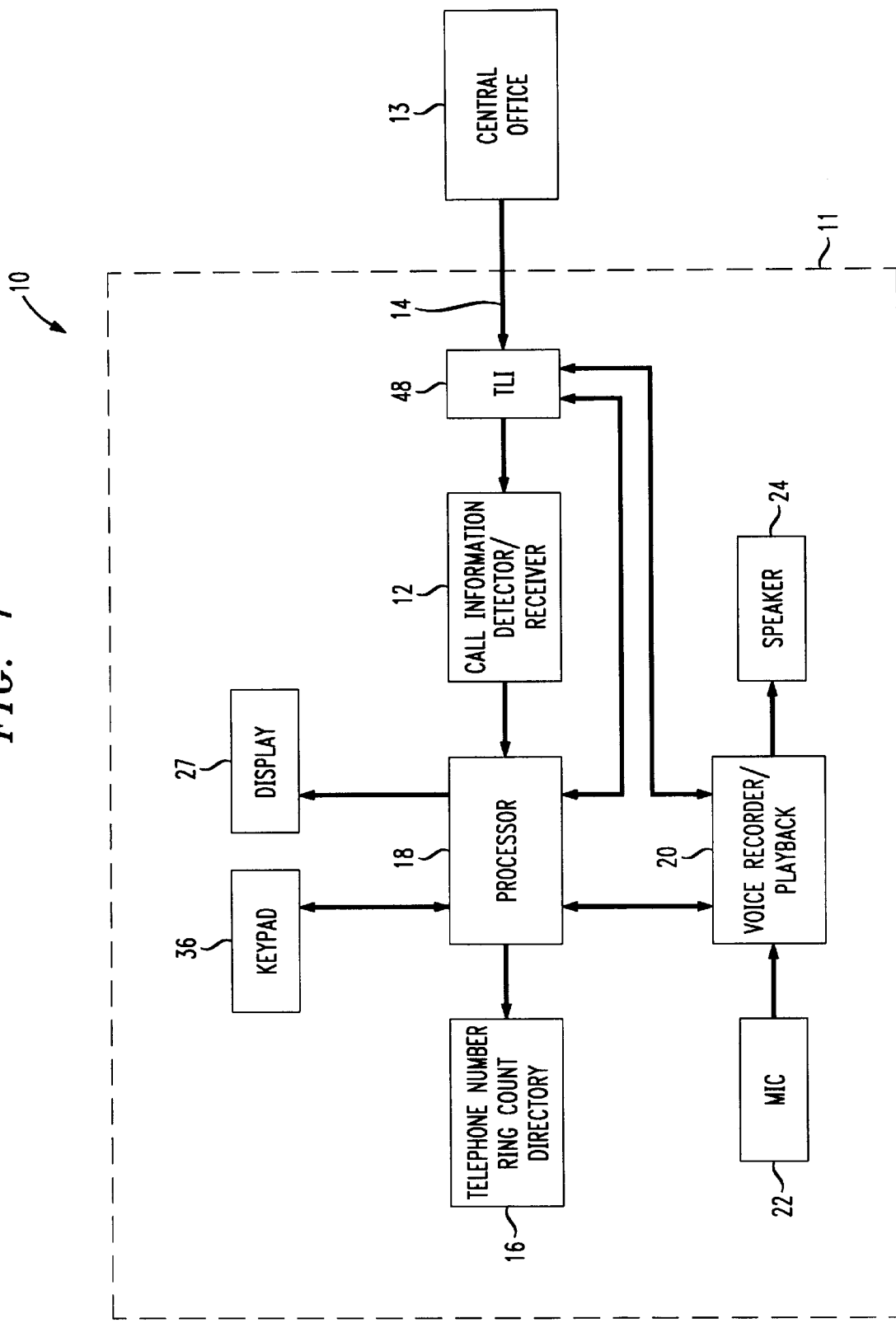
FIG. 1 is a block diagram illustrating a TAD provided in accordance with the principles of the present invention.

With reference to FIG. 1, a voice messaging system provided in accordance with the invention is shown generally indicated at 10 and includes a telephone answering device (TAD) 11. A call related information detector and receiver 12 detects and receives call related information. For instance, the call related information detector/receiver 12 in the present embodiment detects and receives Caller ID information, e.g., the caller's telephone number and/or household name, as described with respect to the prior art Caller ID detector/receiver 112 shown in FIG. 4. When the TAD 11 is on-hook, the call related information from a caller information directory stored at the central office 13 is transmitted by the central office 13 and is received by the call related information detector/receiver 12 generally during the silent interval between the first and second ring. The call related information of the calling party may be stored at a centralized database of the telephone company central office 13 which provides the call related information service, such as Caller ID service. Alternatively, call related information may be stored in a database at the TAD 11.

In the illustrated embodiment, the call related information is a telephone number. A processor 18 compares the received telephone number to pre-stored telephone numbers contained in a telephone number/ring count directory 16. When a match between the received telephone number and a telephone number in the telephone number/ring count directory 16 is made, a pre-programmed variable is obtained indicative of a desired ring count associated with the incoming telephone number. This pre-programmed ring count variable corresponds to the number of rings to wait before the TAD 11 answers the incoming call. Thus, a particular ring count can be set for any call based on call related information about that call sent between the first and second rings.

It can be appreciated that, together with or in lieu of telephone numbers, telephone number/ring count directory 16 may relate other call related information to a pre-programmed ring count. For instance, a household name, area code, city, state, province or other location information may be associated with a particular ring count.

Processor 18 may be any suitable microprocessor, digital signal processor (DSP), or microcontroller.

The telephone number/ring count directory 16 is stored in memory at the TAD 11, e.g., non-volatile Random Access Memory (RAM). When the incoming telephone number or other call related information regarding a calling party matches a telephone number or other call related information in the telephone number/ring count directory 16, the TAD 11 is automatically set to wait a pre-set number of rings based on the pre-programmed variable associated with that telephone number or other call related information in the telephone number/ring count directory 16. The TAD 11 will then wait for that many rings to occur before initiating an outgoing pre-recorded announcing message for that incoming call.

A voice recorder/playback circuit 20 is connected electronically to a standard microphone 22 and speaker 24. The voice recorder/playback circuit 20 controls the outgoing pre-recorded announcing message in conjunction with the processor 18, as well as recording of the received voice message.

The TAD 11 may also include an alpha-numeric keypad 36 for accepting user input to pre-program the variables associated with particular telephone numbers or other call related information stored in the telephone number/ring count directory 16. For instance, a user may program a short number of rings, e.g., one, when calling from their office telephone. Of course, when using Caller ID call related information which is received between the first and second rings, a ring count of one corresponds to no additional rings once a match occurs between the incoming call related information and its corresponding entry in the telephone number/ring count directory 16.

The user may choose to utilize the present invention to assist in screening calls before answering by pre-programming the TAD 11 to wait a longer number of rings, e.g., six, for calls from family and friends, and allow a default shorter number of rings. e.g., one, for unknown calling parties such as telemarketers. In this way, if the telephone is still ringing after a few rings, the user knows the calling party is someone important and the added rings give the user extra time to answer the telephone before the TAD 11 initiates on outgoing announcing message.

A longer number of rings may allow time for a facsimile machine connected to the telephone line 14 to answer a facsimile from an expected party. For instance, the TAD 11 may be set to answer most calls in four or six rings, but require a higher number of rings, e.g., eight, to allow a facsimile machine set to answer after seven rings to pick-up the telephone call before the TAD 11.

The TAD 11 includes a dual tone, multiple frequency (DTMF) decoder and a DTMF generator within processor 18 for controlling the voice recorder/playback circuit 20. Thus, the variable ring count stored in the telephone number/ring count directory 16 may be programmed remotely using DTMF tones which are decoded into control signals by the processor 18.

The TAD 11 also includes a display 27 for displaying call related information about an incoming call. The display 27 may also display the pre-programmed or default ring count associated with that particular calling party. The default ring count may be pre-programmed, and if so is associated with any incoming call for which there is no match on the telephone number ring count directory 16.

Figure 2:
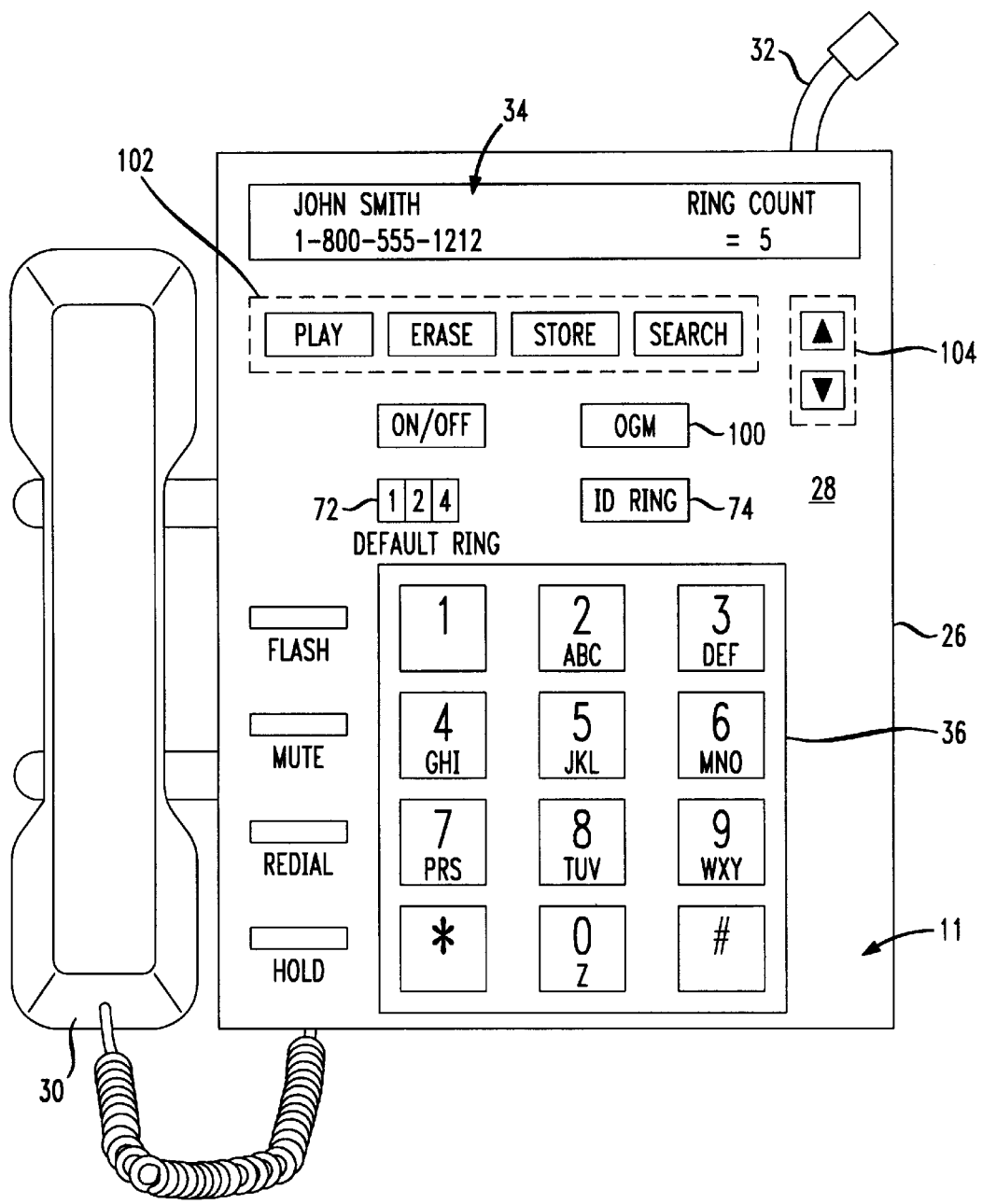
FIG. 2 is a front view of a TAD in accordance with the principles of the present invention.

FIG. 2 shows the TAD 11 packaged to fit within a console 26. The console 26 may be equipped with a standard handset 30 and a standard modular telephone jack 32, e.g., an RJ-11 connector. A control panel 28 includes a liquid crystal display (LCD) 27 and the alpha-numeric keypad 36. As noted above, the display 27 may display the call related information, i.e, the incoming telephone number and/or the household name associated with the incoming telephone number. If there is no match between incoming call related information and information stored in the telephone number/ring count directory 16 corresponding to a pre-programmed ring count, the TAD 11 defaults to a pre-set number of rings either set by default switch 72 or pre-programmed using the keypad 36. For instance, the default ring count may be set to four, and the display 27 will display the default ring count and the status of the ring count as being a "default" setting. If call related information is not available for the incoming call, the display 27 is blank or otherwise indicates that call related information is not available, and the ring count in the TAD 11 for that particular incoming call is set to the default value. Thereafter, the TAD 11 initiates its outgoing announcing message after the default ring count number of rings have occurred. The TAD 11 otherwise includes conventional features such as outgoing message 100, playback and record manual controls 102, and call related information log scrolling controls 104.

Figure 3:
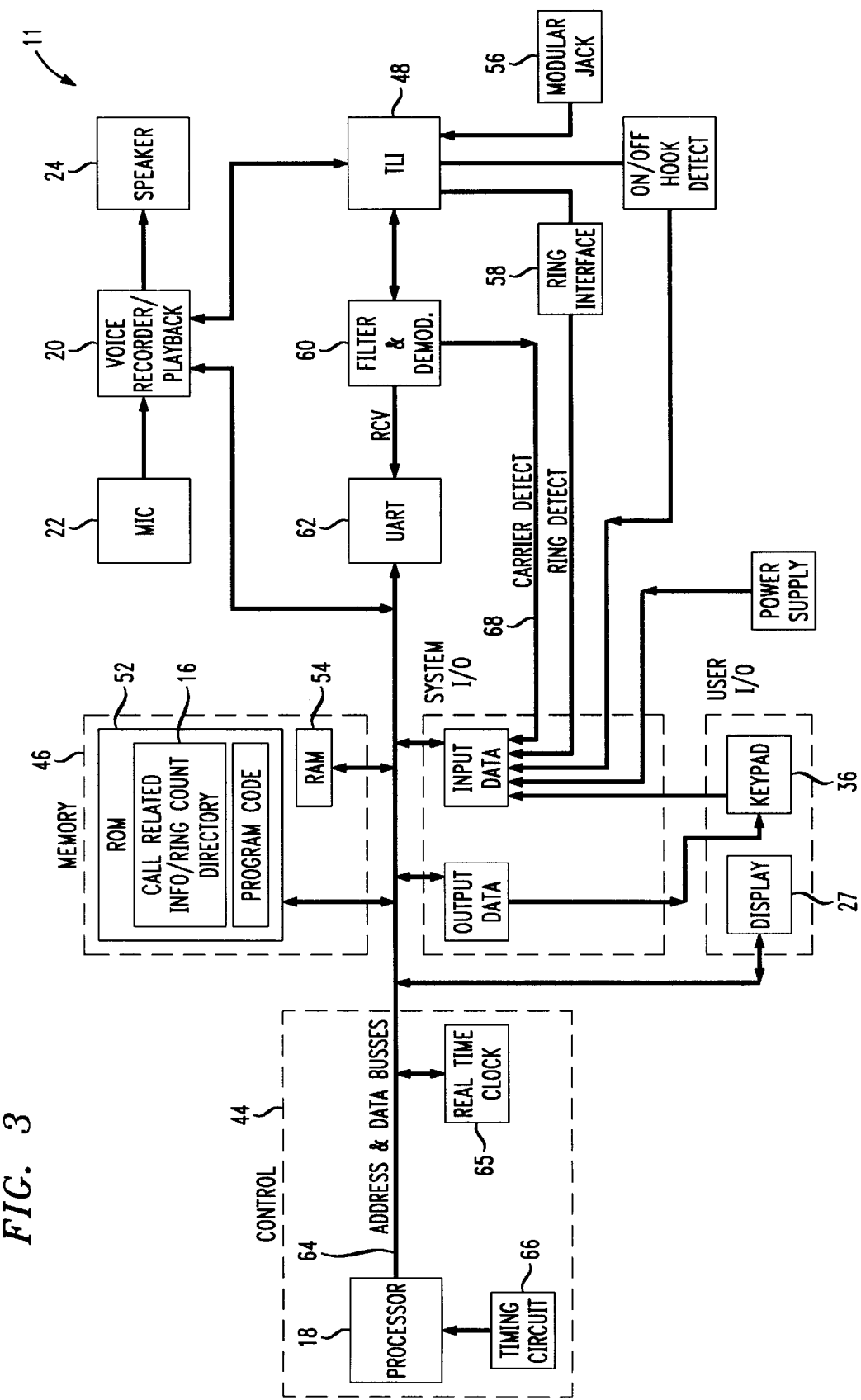
FIG. 3 is a block diagram of the circuit of the TAD shown in FIG. 1.

FIG. 3 shows a detailed circuit diagram of a TAD 11 provided in accordance with the principles of the present invention. The TAD 11 includes a control circuit 44, memory 46 and a telephone line interface (TLI) circuit 48. Control circuit 44 includes processor 18 which controls the system by executing instructions that are stored in memory 46. Memory 46 includes programmable read-only memory (ROM) 52 for storing program code. The telephone number/ring count directory 16 may be stored in RAM 54. Random access memory (RAM) 54 is also provided for general use and to store log data for call related information, voice message data, and the like.

The telephone line interface circuit 48 includes circuitry which permits the TAD 11 to be connected directly to a standard modular telephone jack 32, e.g., an RJ-11 connector. The telephone line interface circuit 48 also includes various control and monitoring circuits that are common to ordinary customer premises equipment. These circuits may include circuitry to interface the telephone handset 30, a ring detect interface circuit 58 provides a signal indicative of a ring signal of the incoming calls to the processor 18, and an on/off hook detect circuit 70. In the illustrated embodiment, the telephone line interface circuit 48 also includes an isolated filter and demodulating circuit 60 to demodulate an incoming serial data stream. A universal asynchronous receiver/transmitter (UART) 62 is used to convert the demodulated serial data received from the filter and demodulating circuit 60 to a parallel format read by the processor 18 via address and data busses 64. Alternatively, the processor 18 can perform the UART function.

In the illustrated embodiment, data received by the filter and demodulating circuit 60 includes call related information, e.g., Caller ID data representing the telephone number of the incoming call. Data corresponding to the household name associated with the incoming call may also be received by the filter and demodulating circuit 60. The protocol and other features relating to the otherwise conventional features of the circuit shown in FIG. 3 are known, e.g., as described in U.S. Pat. No. 4,582,956, the disclosure of which is hereby incorporated by reference into the present specification.

Frequency shift keying, phase shift keying, amplitude modulations, quadrature amplitude modulation or any other suitable modulation technique may be used for transmitting the incoming serial data stream containing the call related information to the TAD 11.

A real time clock circuit 65 and a system timing circuit 66 may also be provided to provide timing for the TAD 11. The real time clock circuit 65 provides the system with the current time and date for time and date stamping received voice messages, while the system timing circuit 66 is used for instruction cycle timing of the processor 18.

In the illustrated embodiment, when a caller initiates a call to the TAD 11, its call related information is transmitted by the central office 13 and received by the telephone number detector/receiver 12 (FIG. 1), e.g., during the silent period between the first and second rings. If the received call related information does not match any call related information pre-programmed in the telephone number/ring count directory 16, then the TAD 11 answers the call by initiating an outgoing message after a default number of rings. The default ring count in the illustrated embodiment is manually selectable at switch 72 (FIG. 2). Alternatively, the default ring count can be pre-programmed by the user via the keypad 36.

Voice signals are transmitted to and from the telephone line through the RJ11 connector 32 and pass through the telephone line interface circuit 48 to the voice recorder/playback circuit 20. The subsequent incoming voice message signal is digitized and compressed for efficient storage by the processor 18. The incoming voice messages are linked with call related information received with respect to that incoming call, and may be retrieved by the user through the voice recorder/playback circuit 20.

The processor 18 also controls the functioning of the voice/playback circuit 20 through controls such as PLAY, RECORD, FAST FORWARD, REWIND, ERASE and STOP signals (FIG. 2).

The processor 18 may count rings directly from data input from the ring detect interface 58, or it may alternatively set a timer. For instance, the timer may be set to expire after a desired amount of time has elapsed. In this case, the desired ring count would be multiplied by six (corresponding to a two second ring and a four second silence gap). The timer would be set with six times the ring count. The processor 18 would be interrupted or otherwise signaled by the timer after the pre-set time had elapsed to answer the incoming call by causing an off-hook condition. The voice/recorder playback circuit 20 would then transmit the pre-recorded outgoing announcing message through the telephone line interface circuit 48 and to the telephone line 14.

A TAD in accordance with the principles of the present invention may also operate in a remote message playback and DTMF detection mode. In this mode, the user listens to a pre-recorded announcing message at a remote telephone. The incoming call from the user is answered by the TAD as described above. At any time during the outgoing announcing message, the user may key-in predefined user ID information using a DTMF keypad generating DTMF tones indicating that the user wishes to listen to stored voice messages. The voice recorder/playback circuit 20 detects the presence of the DTMF tones and converts them into control information for the processor 18. The DTMF tones form a control signal which the processor 18 responds to by either playing back a recorded voice message or by deleting a recorded voice message. As noted above, DTMF tones may also be used to program the variables in directory 16 remotely.

Although an embodiment of a voice messaging system in accordance with the principles of the present invention has been described as a stand-alone device, the voice messaging system may be in the form of a circuit card which is installed within a larger device such as a personal computer (PC) or private branch exchange (PBX).

It can be appreciated that the equipment and method of the invention improves upon the traditional voice messaging system by enabling the call itself to define the number of rings which must occur before the voice messaging system answers a telephone call. In this way, for example, when the user retrieves his or her messages remotely, the ring count can be pre-programmed to recognize the number from which the user is calling and set a low ring count, e.g., one ring so that the user does not need to wait unnecessarily before the voice messaging system answers the call. Thus, in this case, the user can remotely access his or her messages more quickly than with conventional voice messaging systems.

While the invention has been described with reference to the exemplary preferred embodiments thereof, those skilled in the art will be able to make various modifications to the described embodiments of the invention without departing form the true spirit and scope of the invention.

What is claimed is:

1. A variable ring count device in customer premises equipment, said ring count device comprising:
   a processor;
   a call related information detector/freceiver; and
   a call related information directory, said call related information directory associating pre-set call related information with a corresponding ring count, said ring count being a number of rings allowed to ring before initiation of an outgoing announcing message;
   said processor being operable for an incoming call to compare call related information for said incoming call to said pre-set call related information in said call related information directory, and to determine a ring count for said incominqcall based on said comparison.

2. The variable ring count device according to claim 1, wherein:
   said processor determines said ring count for said incoming call while said customer premises equipment is in an on-hook condition.

3. The variable ring count device according to claim 1, wherein:
   said call related information is at least a portion of a telephone number.

4. The variable ring count device according to claim 1, wherein:
   said call related information is Caller ID information.

5. The variable ring count device according to claim 1, further comprising:
   a display connected to said processor.

6. The variable ring count device according to claim 5, wherein:
   said display is adapted and arranged to display said call related information for said incoming call.

7. The variable ring count device according to claim 5, wherein:
   said display is adapted and arranged to display said ring count for said incoming call.

8. The variable ring count device according to claim 5, wherein:
   said display is adapted and arranged to indicate that a default ring count is associated with said incoming call.

9. A variable ring count device comprising:
   a memory adapted and arranged to contain a plurality of ring count values each associated with respective call related information;
   a call related information receiver to receive call related information with respect to an incoming call; and
   a processor to compare said received call related information of said incoming call with said respective call related information contained in said memory to identify one of said plurality of ring count values, each of said ring count values indicating a number of rings allowed to ring before an outgoing announcing message is initiated.

10. The variable ring count device according to claim 9, wherein:
    said call related information is at least a portion of a telephone number of said incoming call.

11. The variable ring count device according to claim 10, wherein:
    said portion of said telephone number is an area code.

12. The variable ring count device according to claim 9, wherein:
    said call related information is a household name associated with said incoming call.

13. The variable ring count device according to claim 9, wherein said processor comprises:
    a digital signal processor.

14. The variable ring count device according to claim 9, further comprising:
    an alpha-numeric keypad in communication with said processor to input said plurality of ring count values and said respective call related information into said memory.

15. A method of setting a ring count for an incoming call, said method comprising:
    detecting and receiving call related information relating to said incoming call;
    comparing said detected and received call related information with a memory containing pre-set call related information with associated values of said ring count, said ring count indicating a number of rings allowed to ring before an outgoing announcing message is initiated; and
    setting said ring count for said incoming call based on said comparison.

16. The method of setting said ring count according to claim 15, wherein:
    said call related information is at least a portion of a telephone number of said incoming call.

17. The method of setting said ring count according to claim 16, wherein:
    said portion of said call related information is an area code.

18. The method of setting said ring count according to claim 15, wherein:
    said call related information is a household name associated with said incoming call.

19. A variable ring count device comprising:
    a processor;
    call related information detector/receiver means for detecting and receiving call related information about an incoming call; and
    call related information memory means for associating pre-set call related information with a corresponding ring count, said ring count indicating a number of rings allowed to ring before initiation of an outgoing announcing message;
    said processor being operable for an incoming call to compare call related information for said incoming call to said pre-set call related information in said call related information memory means, and to determine a ring count for said incoming call based on said comparison.

20. The variable ring count device according to claim 19, wherein:
    said ring count device is in oDerable connection with a customer premises equipment, and wherein said processor determines said ring count for said incoming call while said customer premises equipment is in an on-hook condition.

21. A variable ring count device in customer premises equipment, said ring count device comprising:

a call related information detector/receiver;

a call related information directory, said call related information directory associating pre-set call related information with a corresponding ring count;

a processor, said processor being operable to compare call related information of an incoming call to said pre-set call related information in said call related information directory, and to determine a ring count for said incoming call based on said comparison; and a display connected to said processor, said display being adapted and arranged to display said ring count for said incoming call.

22. A variable ring count device in customer premises equipment, said ring count device comprising:

a call related information detector/receiver;

a call related information directory, said call related information directory associating pre-set call related information with a corresponding ring count;

a processor, said processor being operable to compare call related information of an incoming call to said pre-set call related information in said call related information directory, and to determine a ring count for said incoming call based on said comparison; and a display connected to said processor, said display being adapted and arranged to indicate that a default ring count is associated with said incoming call.

23. A variable ring count device in customer premises equipment, comprising:

a processor;

a call related information detector/receiver; and a call related information directory, said call related information directory associating pre-set call related information with a corresponding ring count, said ring count being a number of rings allowed to ring before initiation of an outgoing announcing message;

said processor being operable for an incoming call to compare call related information for said incoming call to said pre-set call related information in said call related information directory, to determine a ring count for said incoming call based on said comparison, and to take an action upon said incoming call ringing a number of times equal to at least said ring count.

24. The variable ring count device in customer premises equipment in accordance with claim 23, wherein:

said action comprises:

causing said customer premises equipment to transition to an offhook state.

25. The variable ring count device in customer premises equipment in accordance with claim 24, wherein:

said action further comprises:

issuing said outgoing announcing message.

* * * * *